US012755920B2

(12) United States Patent
Guerra Castillo et al.

(10) Patent No.: US 12,755,920 B2
(45) Date of Patent: Oct. 6, 2026

(54) POWER LINE PROTECTION COORDINATION SCHEMES USING PIVOTABLE MULTI-FUSE ASSEMBLIES

(71) Applicant: Saudi Arabian Oil Company, Dhahran (SA)

(72) Inventors: Ricardo Jose Guerra Castillo, Madrid (ES); Nabil El Halabi Fares, Dhahran (SA); Georgios Fotiou, Dhahran (SA); Omar Mohammad Bamasq, Dhahran (SA); Abdulaziz Yahya Hannani, Jazan (SA)

(73) Assignee: Saudi Arabian Oil Company, Dhahran (SA)

( * ) Notice: Subject to any disclaimer, the term of this patent is extended or adjusted under 35 U.S.C. 154(b) by 247 days.

(21) Appl. No.: 18/649,365

(22) Filed: Apr. 29, 2024

(65) Prior Publication Data

US 2025/0308830 A1 Oct. 2, 2025

(51) Int. Cl.
*H01H 31/12* (2006.01)
*H01H 85/02* (2006.01)
(Continued)

(52) U.S. Cl.
CPC .......... *H01H 85/20* (2013.01); *H01H 31/125* (2013.01); *H01H 85/0241* (2013.01);
(Continued)

(58) Field of Classification Search
CPC ........... H01H 31/12–127; H01H 85/20; H01H 85/0241; H01H 85/34; H01H 85/545; H01H 2085/209; H02H 7/26
See application file for complete search history.

(56) References Cited

U.S. PATENT DOCUMENTS 5,796,326 A * 8/1998 Benito .................. H01H 85/28 337/171
10,756,536 B2 8/2020 Kral et al.
(Continued)

FOREIGN PATENT DOCUMENTS

| | | |
|---|---|---|
| CN | 201142562 | 10/2008 |
| CN | 102646968 | 8/2012 |
| EP | 1500119 | 1/2007 |

OTHER PUBLICATIONS

Bak, "EHV/HV Underground Cable Systems for Power Transmission," Department of Energy Technology, Aalborg University, 2015, 40 pages.
(Continued)

*Primary Examiner* — Jacob R Crum
(74) *Attorney, Agent, or Firm* — Dinsmore & Shohl LLP

(57) ABSTRACT

Power line protection coordination schemes using pivotable multi-fuse assemblies includes multiple power line fuse assemblies deployed on a power line. Each fuse assembly includes multiple fuses that can be pivoted about an electrical connection point. Multiple fuses across the multiple power line fuse assemblies are tagged with a common visual code. Multiple such common visual codes are defined. Each common visual code maps to a protection coordination scheme to manage power flowed to loads on the power line. In turn, each protection coordination scheme is mapped to a direction of flow of power. Based on a chosen direction, a protection coordination scheme is identified. When the identified scheme is deployed, all fuses tagged with the visual code mapped to the scheme are deployed by pivoting fuses about the electrical connection point.

10 Claims, 3 Drawing Sheets

(51) Int. Cl.

| | |
|---|---|
| ***H01H 85/20*** | (2006.01) |
| ***H02H 7/26*** | (2006.01) |
| *H01H 85/34* | (2006.01) |
| *H01H 85/54* | (2006.01) |

(52) U.S. Cl.

CPC ......... *H02H 7/26* (2013.01); *H01H 2085/209* (2013.01); *H01H 85/34* (2013.01); *H01H 85/545* (2013.01)

(56) References Cited

U.S. PATENT DOCUMENTS

| | | | | |
|---|---|---|---|---|
| 2020/0126748 | A1* | 4/2020 | Lee | G01R 31/085 |
| 2024/0420903 | A1* | 12/2024 | Adams | H01H 21/165 |
| 2025/0026287 | A1* | 1/2025 | Yamasaki | B60R 16/03 |

OTHER PUBLICATIONS

Khalilnezhad et. al., "Countermeasures of Zero-Missing Phenomenon in (E)HV Cable Systems," IEEE Transactions on Power Delivery, Aug. 2018, 33(4):1657-1667, 11 pages.

Zang et al., "Using t e Fault Current Limiter wit Transformer Type Reactor to Reduce S ort Circuit Currents," presented at the IEEE/PES Transmission & Distribution Conference & Exposition: Asia and Pacific, Dalian, China, Aug. 15-18, 2005, 4 pages.

* cited by examiner

POWER LINE PROTECTION COORDINATION SCHEMES USING PIVOTABLE MULTI-FUSE ASSEMBLIES

CROSS REFERENCE TO RELATED APPLICATIONS

This application claims the benefit of priority to Greek Patent Application No. 20240100231, filed Apr. 2, 2024, the entire contents of which are incorporated by reference in its entirety.

TECHNICAL FIELD

This disclosure relates to power transmission through overhead power lines and more particularly to fuse assemblies implemented in such power lines to ensure protection coordination.

BACKGROUND

A power grid delivers power (i.e., electricity) from power plants to final users (e.g., homes and industries) within a geographic region. A power grid includes a distribution system that includes power lines to transmit the electricity. Distribution systems can be designed as radial, loop or network systems. In a radial distribution system, all of the loads are connected to a single, primary power line. The primary power line is connected to the power plant. A power failure in the primary power line results in a power failure at all the connected loads. In a loop system, the power, that originates from a primary power source, loops through the service area and returns to the original point. The loop can be tied to an alternate power source. If the primary power source goes down, then the alternate power source can continue to provide power to loads connected in the loop. Network systems are interlocking loop systems in which a single destination can receive power from multiple power sources arranged in a network.

The distribution system includes power transformers. The distribution system also includes feeder lines and taps. In addition, all power system includes a protection system intended to ensure integrity of the equipment under any possible operational condition. In this particular case associated to distribution transformers, the protection system is based on fuses protect the transformers from current surges and overloads. For example, a fuse cutout, which is a combination of a fuse and a fuse tube, can be connected to a transformer. In the event of an overcurrent caused, e.g., by a fault in the transformer or other circuit connected to it, the fuse experiences an increase in heat. That increase will cause the fuse to melt disconnecting the transformer from the power line and the fuse tube to drop freely under its own weight thus, making its state visible to power crews. The fuse can also be manually opened by linemen to perform service operations.

SUMMARY

This specification describes technologies relating to a fuse assembly with multi-fuse pivotable supports and methods of using the same to allow power grid system operators to reconfigure the fuse assembly to remain protection wise selective upon changes in the load flow direction.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
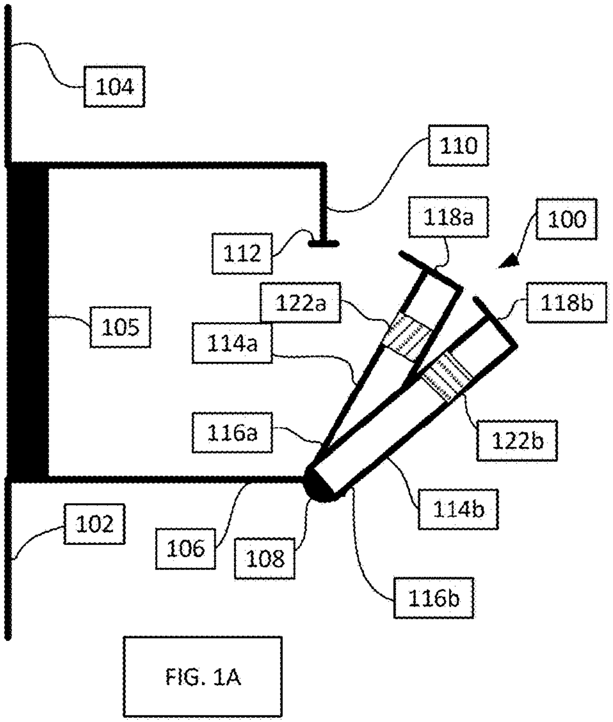
FIGS. 1A-1D are schematic diagrams of different arrangements of a power line fuse assembly.

Electrical designs for existing overhead lines in electrical distribution systems implement redundancies of power supply and penetration of distributed generation. Such designs do not maintain a radial unidirectional load flow in overhead lines. Instead, the designs introduce directional changes to the load flow depending on operational needs. For example, a distribution system can include a power line which begins at a first power source (Generator 1) and terminates at a second power source (Generator 2). Multiple loads can be connected on the power line. Power flow in a first direction from Generator 1 to each load on the power line. Power can also flow in a second direction, opposite (i.e., reverse of) the first direction, from Generator 2 to each load on the power line. Such reversal of flow direction introduces a challenge of configuring protective devices (e.g., fuse cutouts deployed along the power line) to maintain selective and adequate protection coordination. For example, in the example distribution system mentioned above, a first fuse may be upstream of a second fuse when power flows from Generator 1 in the first direction. Upon reversal of flow direction, i.e., from Generator 2 in the second direction, the second fuse becomes upstream of the first fuse. Thus, the reversal of flow direction can cause a miscoordination in fuse utilization and disconnect more loads (users) than what was really needed.

This disclosure describes a protective device for deployment in electrical distribution systems and a technical methodology to use the protective device that can overcome the limitations mentioned above, especially upon changes of flow direction of power on a power line. As described below, the protective device can be a power line pivotable fuse assembly that includes multiple fuses. Each fuse can electrically connect two power terminals to permit power transmission through a power line connected to the power terminals. Each fuse can have a respective electrical rating that causes the fuse to break (i.e., the fuse wire to melt) in response to a respective electrical condition. The multiple fuses can be installed in fuse holders on a pivotable assembly that connects only one fuse at a time between the two terminals. The fuse holder can pivot allowing any selected fuse of the multiple fuses to be replaced with a different fuse. The construction and arrangement of one such power line fuse assembly can serve to protect the electrical distribution system in response to different electrical conditions. Multiple such power line fuse assemblies can be deployed at multiple locations on the power line of the electrical distribution system. By implementing a methodology to switch fuses in each such power line fuse assembly, considering changes in the direction of power flow, the system can be successfully operated and protected.

Implementing the techniques described in this disclosure can provide one or more of the following advantages. The techniques allow deploying a properly coordinated protection system for electrical distribution systems. Such protection systems can ensure that the closest fuse to a point of fault on a power line will melt, thereby disconnecting the minimum number of loads. The techniques can minimize or avoid miscoordination in deployment of protective devices in response to a change in direction of power flow. The techniques can also minimize costs and the invasive technology associated with deploying reclosers. The techniques described here can ensure that, when changes in the system configuration are necessary or part of the operating mode (e.g., displacing the Normally Open (NO) point), the protection scheme is suitable to guarantee reliability of the system. As described below, each power flow direction will be associated with a fuse size and a visual code (e.g., a fuse holder color) at every single point where the protection system is needed. The visual code can help power line crews to identify whether the active protection system, i.e., fuses connected to the power line, are the correct ones based on the power flow direction.

FIGS. 1A-1D are schematic diagrams of different arrangements of a power line fuse assembly 100. The power line fuse assembly 100 can be one of many fuse assemblies deployed in an electrical distribution system. The electrical distribution system includes a power line that transmits power to multiple destinations. The power line includes a first power source at a first end and a second power source at a second end of the power line. The electrical distribution system can flow power in one direction (i.e., from the first power source to the loads on the power line) or the opposite direction (i.e., from the second power source to the loads on the power line).

In some implementations, the power line fuse assembly 100 can connect a first section 102 of the power line to a second section 104 of the power line. The first section 102 of the power line terminates at a first power terminal 106, which serves as a connection point to the pivotable point 108 of the fuse holders. The pivotable point 108 is configured to simultaneously be in electrical contact with multiple fuse holders that can receive respective multiple fuses (for example, a first fuse 114*a*, a second fuse 114*b* or more fuses). Each fuse in the power line fuse assembly 100 can be rated to operate for different operational conditions. For example, the first fuse 114*a* can fail when an electrical load exceeds 15 amps (15 A). The second fuse 114*b* can fail when the electrical load exceeds 25 A. A third fuse (not shown) can fail when the electrical load exceeds 40 A. In this manner, a single power line fuse assembly 100 can include multiple fuses, each rated to fail at a respective electrical condition. In the context of this disclosure, a fuse operates when the electrical current through the fuse exceeds the rated amperage causing the fuse to melt, thereby breaking the electrical circuit.

The second section 104 of the power line terminates at a second power terminal 110. The second power terminal 110 is configured to connect to a second connection point 112. The second connection point 112 is configured to receive only one fuse but also to allow a close transition from one fuse holder to another without interrupting the power flow while the system is energized. Each fuse of the power line fuse assembly 100 can electrically connect to the first power terminal 106 and the second power terminal 110 to permit power transmission from the first section 102 of the power line to the second section 104 of the power line through each fuse. An insulator 105 is connected between the first power terminal 106 and the second power terminal 110 to prevent power transmission directly from the first section 102 to the second section 104 of the power line.

The pivotable point 108 is pivotable about the first power terminal 106. Each fuse holder and fuse have a first end and a second end. For example, the first fuse 114*a* has a first end 116*a* and a second end 118*a*. The second fuse 114*b* has a first end 116*b* and a second end 118*b*. The first end of each fuse is received by and electrically connected to a fuse holder. In turn, the fuse holder is electrically connected to the pivotable point 108. Thus, each first end of each fuse is simultaneously, electrically connected to the pivotable point 108. The pivotable point 108 serves as a common electrical junction that electrically connects all the first ends of the fuses to the first power terminal 106. Power flowed in a first direction through the first section 102 of the power line is received by each first end of each fuse at the same time. As described later, power can also flow in a second direction opposite the first direction from the second section 104 of the power line to the second connection point 112.

The first ends of the multiple fuses are successively mounted to the pivotable first connection point 108. As mounted, a fuse is adjacent to another fuse. Further, the multiple fuses are spaced apart along an arc whose geometric center, ensures clearance from the energized part at the pivotable point 108 and from the other end as well. The pivotable point 108 pivots to move the multiple fuses along the arc in a step-wise manner. As described above, the step-wise, angular movement of the multiple fuses about the first holder 108 can be controlled manually, e.g., by a human operator rotating the pivotable point 108, or automatically, e.g., by a controller operating a mechanism (e.g., a stepper motor) to rotate the pivotable point 108.

Each fuse of the multiple fuses in the power fuse assembly 100 is coded to be visually distinct from each other fuse of the multiple fuses. For example, the first fuse 114*a* includes a visual code 122*a*. The second fuse 114*b* has a visual code 122*b*. The visual code 122*a* is visually different from the visual code 122*b*. For example, the visual code 122*a* can be a certain color while the visual code 122*b* can be a different color from that of the visual code 122*a*. Other visually distinct codes are possible. For example, the visual distinction can be discernible to a machine rather than to a human eye. Therefore, each visual code can be a distinct bar code or other machine-readable code. As described later with reference to FIGS. 2A and 2B, an electrical distribution system can implement multiple power fuse assemblies. Each such fuse assembly can include a fuse that shares a common visual code with a fuse in each other fuse assembly. In this manner, a family of fuses, each implemented in a separate power fuse assembly, shares a common visual code. Multiple families of such fuses, each family having fuses of different visual codes, can be implemented across the electrical distribution system.

The visual code associated with each fuse represents a protection coordination scheme to which the fuse belongs. A protection coordination scheme includes multiple fuses, each having the same visual code. In a first example, in an electrical power distribution scheme in which power flows through five loads in a first direction, five power fuse assemblies can be installed upstream of the five respective loads. Each power fuse assembly can have a respective fuse that has the same visual code. Together, the five fuses form a first protection coordination scheme identifiable by the common visual code. In a second example, power can flow through the five loads in a second direction different from the first direction. In this second example, the five fuses upstream of the five respective loads can have a common visual code that is different from the common visual code of the first example. Together, the five fuses form a second protection coordination scheme identifiable by the common visual code that is different from the common visual code of the first example. The common visual code can be used to ensure coordination in the protection schemes. In the first example, the common visual code can be a red color, and the fuse sizes can be 100 A, 80 A, 60 A, 40 A and 20 A. In the second example, the common visual code can be a blue color, and the fuse sizes can be 20 A, 40 A, 50 A, 70 A and 90 A.

The second connection point 112 can be electrically connected to either a second end of only one of the fuses or to transition connection point (or a middle point) to which the second ends of two fuses are simultaneously, electrically connected. As the pivotable point 108 pivots, the pivotable point 108 can transition through different configurations. In a first such configuration (a fully open configuration), the second connection point 112 is not in electrical contact with any fuse that is in electrical contact with the pivotable point 108. In a second such configuration (a closed configuration), the second connection point 112 is in electrical contact only with a second end of a second fuse. In a third such configuration (a transition configuration), the second connection point 112 is simultaneously in electrical contact with second ends of two second fuses. In operation, the pivotable point 108 can pivot the fuses from a fully open configuration to a closed configuration. The pivotable point 108 can also pivot the fuses from a first closed configuration to a temporary transition configuration, and from the transition configuration to a second closed configuration.

FIG. 1A schematically shows a configuration (e.g., a fully open configuration) in which none of the fuses have been engaged to the second fuse holder 112. For example, the pivotable point 108 has pivoted (or has been pivoted) to a position in which neither the second end 118*a* nor the second end 118*b* of the first fuse 114*a* or the second fuse 114*b*, respectively, is engaged to (i.e., in electrical contact with) the second fuse holder 112. Even in the fully open configuration each first end of each fuse is engaged to (i.e., in electrical contact with) the pivotable point 108.

Figure 1B:
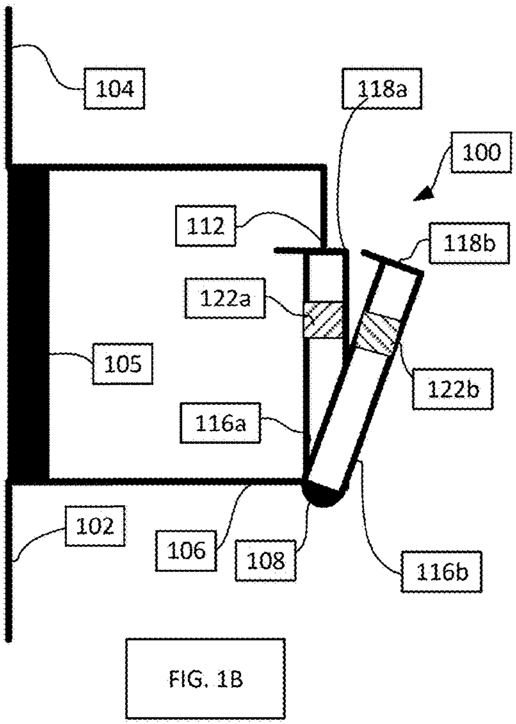

FIG. 1B schematically shows a configuration (e.g., a closed configuration) in which one of the fuses has been engaged to the second fuse holder 112. For example, the pivotable point 108 has pivoted the second end (e.g., the second end 118*a*) of one of the fuses (e.g., the first fuse 114*a*) to engage to the second fuse holder 112. The first ends of all fuses remains engaged to the pivotable point 108. Consequently, power can flow from the first section 102 to the second section 104 through the first fuse 114*a*, while the remaining fuses remain electrically disconnected from the second terminal 110.

Figure 1C:
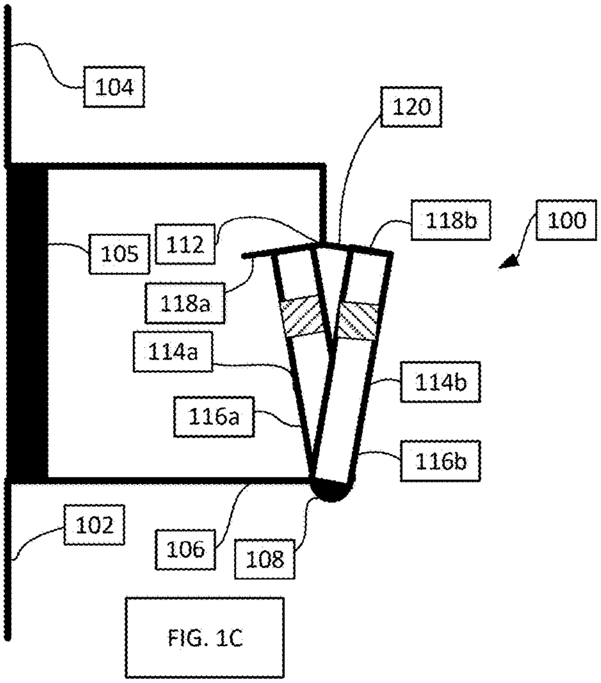

FIG. 1C schematically shows a configuration (e.g., a transition configuration or a closed transition) in which both fuses have been engaged to the second connection point 112. The transition configuration is an in-between stage between two fully closed configurations. That is, as the pivotable point 108 moves the fuses in a step-wise, angular path, the pivotable point 108 can position an in-between position 120 (in between the second end 118*a* of the first fuse 114*a* and the second end 118*b* of the second fuse 114*b*) at the second fuse holder 112. The in-between position is engaged with (i.e., is electrically connected to) the second ends of both the fuses 114*a* and 114*b*. Consequently, power flows from the first section 102 to the second section 104 through the in-between position 120 to both fuses 114*a* and 114*b*. The transition configuration is temporary in that the pivotable point 108 moves the in-between position 120 away from the second connection point 112 and, in its place, positions the second end 118*b* of the second fuse 114*b*. In the context of this disclosure, any "end," "point," "connection" or "position" to which power can flow is an electrical lead that can be electrically connected to the power line.

Figure 1D:
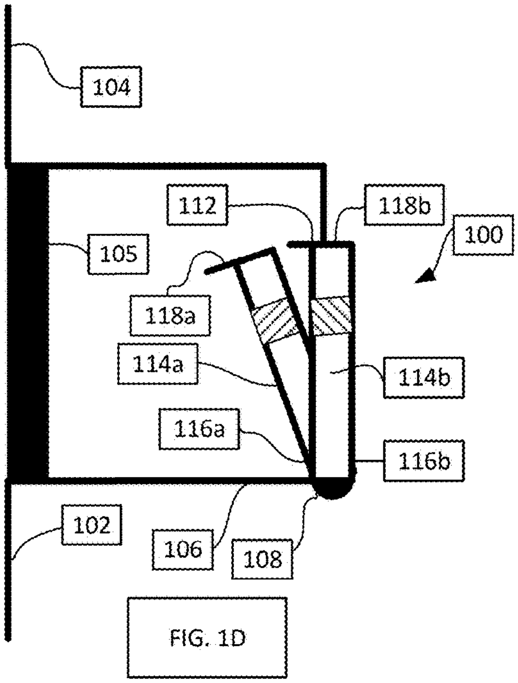

FIG. 1D schematically shows a configuration (e.g., another closed configuration) in which one of the fuses has been engaged to the second fuse holder 112. For example, the pivotable point 108 has pivoted from the transition configuration (FIG. 1C) to engage the second end 118*b* of the second fuse 114*b* to the second fuse holder 112. The first ends of all fuses continue to remain engaged to the pivotable point 108. Consequently, power can flow from the first section 102 to the second section 104 through the second fuse 114*b*, while the remaining fuses remain electrically disconnected from the second terminal 110.

Figure 2A:
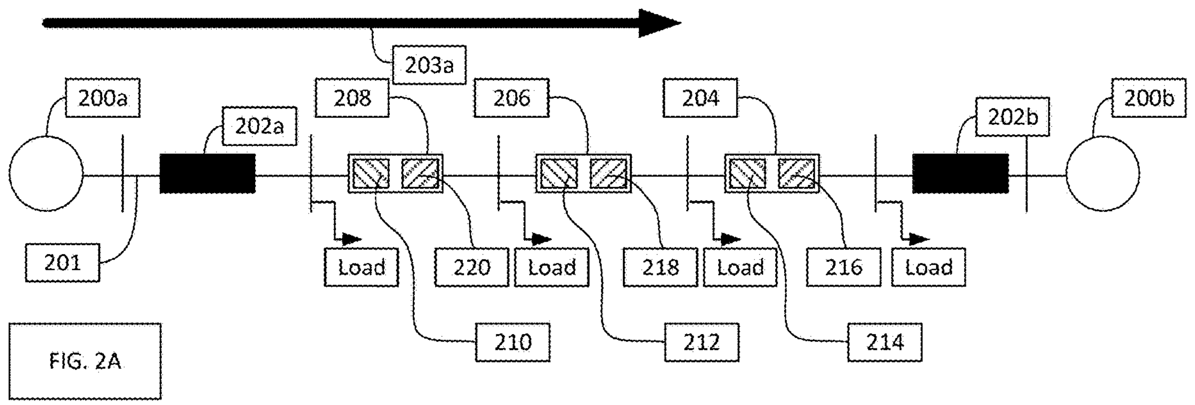
FIGS. 2A and 2B are schematic diagrams of deployment of multiple power line fuse assemblies deployed in an electrical distribution system.
Figure 2B:
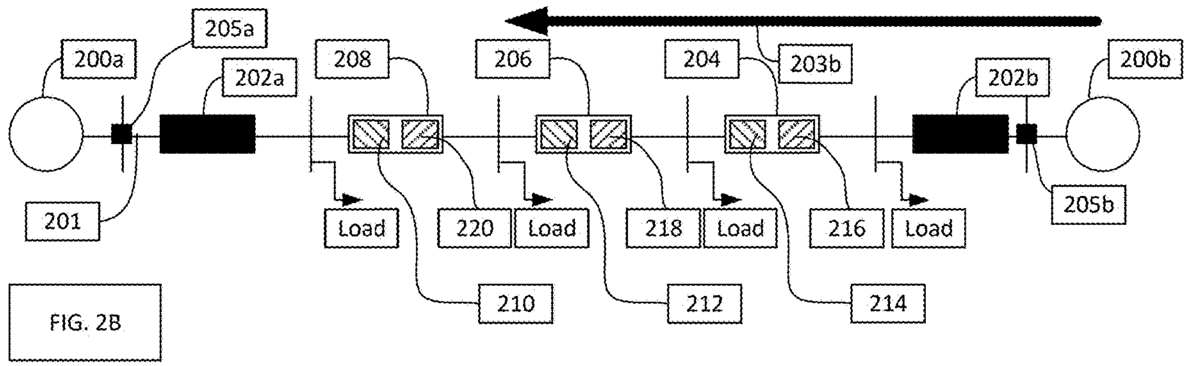

FIGS. 2A and 2B are schematic diagrams of deployment of multiple power line fuse assemblies deployed in an electrical distribution system. The electrical distribution system includes two power sources (e.g., a first power source 200*a*, and a second power source 200*b*). The first power source 200*a* is connected to a first bus 205*a*. The second power source 200*b* is connected to a second bus 205*b*, each of which is on a power line 201. Electrical power can flow through the power line 201 from the first bus 205*a* to the second bus 205*b* (as represented by arrow 203*a* in FIG. 2A) or from the second bus 205*b* to first bus 205*a* (as represented by arrow 203*b* in FIG. 2B). At any given time, only one power source (either power source 200*a* or power source 200*b*) is connected such that power flows either in the first direction or in the second direction. In some instances, e.g., when changing over the source from one power source to the other, both power sources can be connected. An operator can switch the direction of the flow of power between the power sources.

The electrical distribution system can implement multiple circuit breakers (e.g., a first circuit breaker 202*a*, a second circuit breaker 202*b*). For example, the first circuit breaker 202*a* can be closer to the first power source 200*a*. The second circuit breaker 202*b* can be closer to the second power source 200*b*. Each circuit breaker is used to open and close the electrical circuit, i.e., to connect or disconnect the circuit from the power sources. For example, when the circuit breaker 202*a* connects the first power source 200*a* and the second circuit breaker 202*b* disconnects the second power source 200*b* from the power line 203, power flows in the direction of arrow 203*a*. In another example, when the circuit breaker 202*b* connects the second power source 200*b* and the first circuit breaker 202*a* disconnects the first power source 200*a* from the power line, power flows in the direction of arrow 203*b*. As described below, depending on the direction of flow of power, different fuses that share a common visual code can be deployed in a protection coordination scheme.

The electrical distribution system includes multiple power fuse assemblies (e.g., a first assembly 204, a second assembly 206, a third assembly 208, or more or fewer assemblies) deployed on the power line 201. Each power fuse assembly is substantially similar to the power fuse assembly 100 (FIGS. 1A-1D). Each power fuse assembly has multiple fuses, each having a respective visual code, e.g., a color or a machine-readable code. Each fuse of the multiple fuses can have a separate load rating, e.g., a 15 A fuse, a 25 A fuse, a 40 A fuse, a 60 A fuse, an 80 A fuse, a 100 A fuse and so on). Fuses to be deployed when power flows through the power line in a certain direction can have the same visual code.

For example, when power flows in a first direction, the fuses (from upstream nearer to the power source to downstream farther away from the power source) can have load ratings of 100 A, 80 A and 60 A, respectively. In this protection coordination scheme, the three fuses with these load ratings will have the same visual code, e.g., a red color. Thus, when power is to flow in the first direction, the protection coordination scheme will cause all red color fuses to be deployed. When power flows in a different direction (e.g., the opposite of the first direction in the previous example), the fuses (from upstream nearer to the power source to downstream farther away from the power source) can have load ratings of 100 A, 80 A and 60 A, respectively. In this protection coordination scheme, the three fuses with these load ratings will have the same visual code, e.g., a blue color. When power is to flow in the second direction, the protection coordination scheme will cause all blue color fuses to be deployed. In this manner, a visual code can be associated with each respective direction in which power is to flow. Appropriate fuses can be tagged with the visual code. When power is to flow in any direction, the protection coordination scheme associated with that direction will cause the fuses tagged with the appropriate visual code to be deployed.

In the electrical distribution system shown in FIG. 2A, power flows from the first power source 200*a* through the power line 201 in the direction shown of the arrow 203*a*. The first assembly 208 is nearest to the first power source 200*a* and deploys a fuse 210 that has the highest load rating (e.g., 100 A). The second assembly 206 and the third assembly 204 are downstream of the first assembly 208, and deploy fuses 212 and 214, respectively, whose load ratings are lesser than that of the fuse 210. Further, the fuse 212 deployed by the second assembly 206 has a higher rating (e.g., 80 A) than the fuse 214 deployed by the third assembly 204 (e.g., 20 A). The three fuses 210, 212, 214 deployed by the three assemblies 208, 206, 204 when power flows in the direction of the arrow 203*a* can be tagged with a common visual code, e.g., a red color (shown schematically by the same cross-hatch). As described earlier, each fuse assembly includes a respective pivotable point to which multiple fuses are connected. In this example, each fuse tagged with the red color is electrically connected to the pivotable point of each fuse assembly. Upon determining that power is to flow in the direction of the arrow 203*a*, all red-tagged fuses can be deployed, e.g., in a single step.

In the electrical distribution system shown in FIG. 2B, power flows from the second power source 200*b* through the power line 201 in the direction shown of the arrow 203*b*. In that power flow configuration, the third assembly 204 is nearest to the second power source 200*b* and deploys a fuse 216 that has the highest load rating (e.g., 100 A). The second assembly 206 and the third assembly 208 are downstream of the first assembly 204, and deploy fuses 218 and 220, respectively, whose load ratings are lesser than that of the fuse 216. Further, the fuse 218 deployed by the second assembly 206 has a higher rating (e.g., 80 A) than that deployed by the first assembly 208 (e.g., 20 A). The three fuses 216, 218 and 220 deployed by the three assemblies 204, 206 and 208 when power flows in the direction of the arrow 203*b* can be tagged with a common visual code, e.g., a blue color (shown schematically by the same cross-hatch). As described earlier, each fuse assembly includes a respective pivotable point to which multiple fuses are connected.

In this example, each fuse tagged with the blue color is electrically connected to the pivotable point of each fuse assembly. Upon determining that power is to flow in the direction of the arrow 203*b*, all blue-tagged fuses can be deployed, e.g., in a single step.

Figure 3:
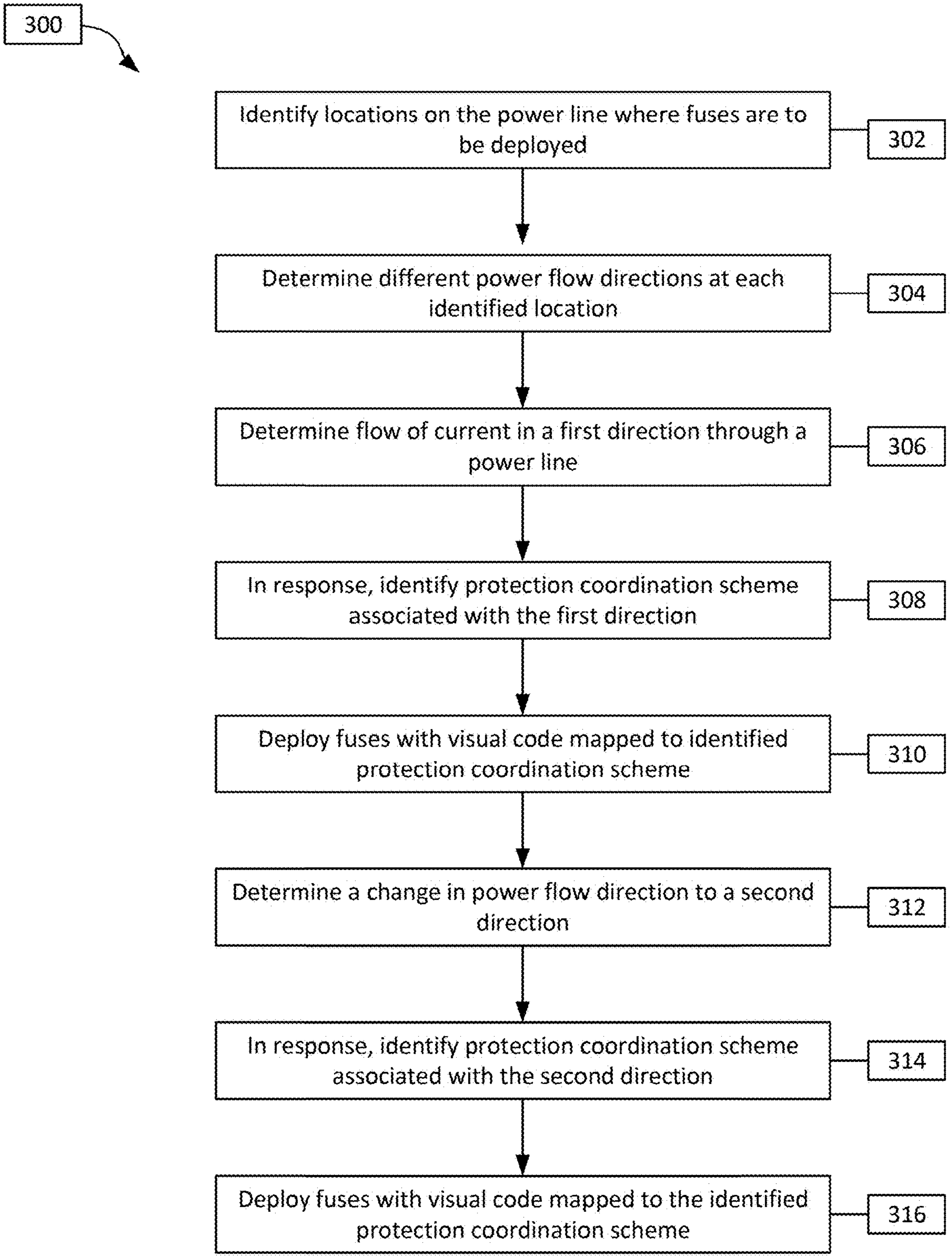
FIG. 3 is a flowchart of an example of a method of using the propose power line fuse assemblies in an electrical distribution system.

FIG. 3 is a flowchart of an example of a method 300 of deploying multiple power line fuse assemblies in an electrical distribution system. In some implementations, the method 300 is deployed by grouping fuses by the visual code described earlier. In particular, the fuses are grouped to form a protection coordination scheme (or protection coordination group or protection coordination study) which can be associated with a specific configuration of the electrical distribution system. For example, fuses of different fuse ratings, which are to be deployed for power flow in a particular direction are assigned a visual code. Fuses tagged with different visual codes are identified and deployed in a pivotable point of each fuse assembly. Multiple such fuse assemblies are deployed across the power line. Upon identifying a direction of power flow, the appropriate protection coordination scheme can be energized using a hot stick. To do so, for example, the fuses tagged with the visual code that is mapped to the identified direction of power flow can be deployed. Upon determining a change in the direction of power flow, the fuses tagged with the visual code that is mapped to the new direction of power flow can be deployed in the same way.

For example, at 302, all locations on the power line where protection devices (fuses) are to be deployed are identified. At 304, different power flow directions at each location identified at 302 are determined. As described earlier, each power flow direction will be mapped to a protection coordination scheme. Each protection coordination scheme will be associated with a visual code. Each fuse to be deployed in the protection coordination scheme will be tagged with the associated visual code.

At 306, a flow of current in a first direction through a power line is determined. For example, a decision can be made to flow power from the first power source 202*a* through the power line 201 in the direction of the arrow 203*a* (FIG. 2A).

At 308, in response to determining the flow of current in the first direction, the protection coordination scheme associated with the first direction is identified. For example, the visual code associated with the protection scheme is identified. In some implementations, a table can be generated that maps the power flow directions, the protection coordination schemes, and visual codes. Upon determining the power flow direction, the table can be looked up to identify the corresponding protection coordination scheme and visual code. For example, the table can be stored on a computer-readable storage medium and looked up (i.e., read) by one or more processors of a computer system. In some implementations, the table can be displayed on a display device (e.g., a monitor) coupled to the computer system. An operator can look up the table on the display device.

At 310, the fuses having the visual code that mapped to the identified protection coordination scheme are deployed. To deploy the identified protection coordination scheme, the pivotable points in the different fuse assemblies on the power line can be pivoted such that fuses with the same visual codes are electrically connected to transmit power.

At 312, a change in the power flow direction from the first direction to a second direction different from the first is determined. For example, an operator of the electrical distribution system can decide to change the power flow direction from the first direction to the second direction.

At 314, in response to determining the change in the power flow direction from the first direction to the second direction, the protection coordination scheme associated with the second direction is identified. For example, the visual code associated with the protection scheme is identified.

At 316, the fuses having the visual code that mapped to the identified protection coordination scheme are deployed. For example, if the visual code identified at 314 is blue, then, at 316, all the blue-tagged fuses in the fuse assemblies are deployed by pivoting movement of the pivotable points in each fuse assembly until each assembly's blue-tagged fuse is electrically connected to transmit power.

In some implementations, the determination of the protection coordination scheme, the identification of the associated color code, and the identification of appropriate fuses tagged with the color code can be implemented prior to actual flow of power. The pivotable first connection points can be operated to engage the identified fuses before the flow of power is turned on. In such implementations, the pivotable points can move the respective fuses from open configurations to closed configurations. In some implementations, power can be flowing in one direction when a change in power flow direction is initiated. In such implementations, the pivotable points can move the respective fuses from open configurations to transition configurations. As described earlier, in a transition configuration, both the previously deployed fuse and the fuse to be deployed are electrically connected by an in-between electrical connection point. The transition configurations are then changed to closed configurations in which the new fuses associated with the new protection coordination scheme are deployed.

In some implementations, the pivotable first connection point of a fuse assembly can support more than one fuse with the same electrical rating. In such implementations and as needed, the pivotable first connection point can be operated to replace a failed fuse with a particular load rating with a new fuse with the same load rating. In such implementations, a failed fuse having a visual code can be replaced by a new fuse having the same visual code, but without the time and cost intensive interventions. In this manner, faults due to failed fuses can be cleared by the closest protective devices. Doing so results in disconnecting minimum number of loads, thereby improving system reliability and maximizing system power supply continuity.

EXAMPLES

Certain aspects of the subject matter described here can be implemented as a power line fuse assembly system. The system includes multiple power line fuse assemblies electrically connected to each other via a power line that is configured to transmit electrical power. Each power line fuse assembly includes a first power terminal and a second power terminal that can electrically connect to a first section and a second section, respectively, of the power line. Each power line fuse assembly includes multiple fuses. Each fuse can electrically connect to the first power terminal and the second power terminal to permit power transmission from the first section of the power line to the second section of the power line through each fuse. Each power line fuse assembly includes a pivotable first connection point electrically connected to the first power terminal. The pivotable fuse holder is configured to receive first ends of the plurality of fuses and to electrically connect, simultaneously, the first ends to the first power terminal. Each power line fuse assembly includes a second connection point electrically connected to the second power terminal. The second connection point is configured to electrically connect to respective second ends of the multiple fuses. Each of the multiple fuses includes a respective first fuse resulting in multiple first fuses. The multiple first fuses are visually identical to each other. Each respective first fuse is visually different from a remainder of the multiple fuses in each power line fuse assembly.

An aspect combinable with any other aspect includes the following features. The multiple fuses includes a first fuse and a second fuse. A first end of the first fuse and a first end of the second fuse are simultaneously electrically connected to the pivotable first connection point. The pivotable first connection point is configured to pivot such that, in a first configuration, a second end of the first fuse is electrically connected to the second connection point. A second end of the second fuse is electrically disconnected from the second connection point.

An aspect combinable with any other aspect includes the following features. The pivotable first connection point is configured to pivot such that, in a second configuration in which the pivotable first connection point has pivoted from the first configuration, both the second end of the first fuse and the second end of the second fuse are electrically connected to the second connection point.

An aspect combinable with any other aspect includes the following features. The pivotable first connection point is configured to pivot such that, in a third configuration in which the pivotable first connection point has pivoted from the first configuration and the second configuration, the second end of the first fuse is electrically disconnected from the second connection point and the second end of the second fuse is electrically connected from the second connection point.

An aspect combinable with any other aspect includes the following features. Each of the first connection point and the second connection point is a fuse holder configured to receive fuses.

An aspect combinable with any other aspect includes the following features. The multiple first fuses that are visually identical to each other are tagged with the same visual code.

An aspect combinable with any other aspect includes the following features. The visual code is mapped to a protection coordination scheme.

An aspect combinable with any other aspect includes the following features. The protection coordination scheme is mapped to a direction of flow of power through the power line.

An aspect combinable with any other aspect includes the following features. The assembly includes a table including multiple directions of flow of power through the power line, multiple protection coordination schemes mapped to the corresponding multiple directions of flow, and multiple visual codes mapped to the corresponding protection coordination schemes.

An aspect combinable with any other aspect includes the following features. The multiple fuses are coded to be visually distinct from each other.

Certain aspects of the subject matter described here can be implemented as a method. The method is implemented in a power line electrically connected to multiple power line fuse assemblies. Each fuse assembly includes features described above. To implement the method, it is determined that power is to be flowed in a first direction through the power line. In response, multiple first fuses are deployed. Each first fuse is included in the respective multiple fuses. Each of the multiple first fuses shares a common visual code that specifies a corresponding first protection coordination scheme. It is determined that the direction of flow of power is to be changed from the first direction to a second direction through the power line. In response, multiple second fuses are deployed in place of the multiple first fuses. Each second fuse is included in the respective multiple fuses. Each of the second fuses shares a common visual code that is mapped to a corresponding second protection coordination scheme. The common visual code corresponding to the second protection coordination scheme is different from that corresponding to the first protection coordination scheme.

An aspect combinable with any other aspect includes the following features. A first end of each first fuse and a first end of each second fuse is simultaneously electrically connected to a respective pivotable connection point. To deploy the multiple second fuses in place of the multiple first fuses, each pivotable connection points pivots the first end of each first fuse and the first end of each second fuse.

An aspect combinable with any other aspect includes the following features. A second end of each first fuse is electrically connected to a respective connection point. A second end of each second fuse is electrically disconnected from the respective connection point. In response to each pivotable first connection point pivoting, the second end of each first fuse is electrically disconnected from the respective connection point and the second end of each second fuse is electrically connected to the respective connection point.

An aspect combinable with any other aspect includes the following features. In response to each pivotable first connection point pivoting, both the second end of each first fuse and the second end of each second fuse are electrically connected to the respective connection point.

An aspect combinable with any other aspect includes the following features. The visual code is a color.

Thus, particular implementations of the subject matter have been described. Other implementations are within the scope of the following claims.

The invention claimed is:

1. A power line fuse assembly system comprising:

a plurality of power line fuse assemblies electrically connected to each other via a power line configured to transmit electrical power, each power line fuse assembly comprising:

a first power terminal configured to electrically connect to a first section of the power line;

a second power terminal configured to electrically connect to a second section of the power line;

a plurality of fuses, each fuse configured to electrically connect to the first power terminal and the second power terminal to permit power transmission from the first section of the power line to the second section of the power line through each fuse;

a pivotable first connection point electrically connected to the first power terminal, the pivotable first connection point configured to receive first ends of the plurality of fuses and to electrically connect, simultaneously, the first ends to the first power terminal, and a second connection point electrically connected to the second power terminal, the second connection point configured to electrically connect to respective second ends of the plurality of fuses, wherein each of the plurality of fuses comprises a respective first fuse resulting in a plurality of first fuses, wherein the plurality of first fuses are visually identical to each other, wherein each respective first fuse is visually different from a remainder of the plurality of fuses in each power line fuse assembly.

2. The system of claim 1, wherein the plurality of fuses includes a first fuse and a second fuse, wherein a first end of the first fuse and a first end of the second fuse are simultaneously electrically connected to the pivotable first connection point, wherein the pivotable first connection point is configured to pivot such that, in a first configuration, a second end of the first fuse is electrically connected to the second connection point and a second end of the second fuse is electrically disconnected from the second connection point.

3. The assembly of claim 2, wherein the pivotable first connection point is configured to pivot such that, in a second configuration in which the pivotable first connection point has pivoted from the first configuration, both the second end of the first fuse and the second end of the second fuse are electrically connected to the second connection point.

4. The assembly of claim 3, wherein the pivotable first connection point is configured to pivot such that, in a third configuration in which the pivotable first connection point has pivoted from the first configuration and the second configuration, the second end of the first fuse is electrically disconnected from the second connection point and the second end of the second fuse is electrically connected from the second connection point.

5. The assembly of claim 1, wherein each of the first connection point and the second connection point is a fuse holder configured to receive fuses.

6. The assembly of claim 1, wherein the plurality of first fuses that are visually identical to each other are tagged with the same visual code.

7. The assembly of claim 6, wherein the visual code is mapped to a protection coordination scheme.

8. The assembly of claim 7, wherein the protection coordination scheme is mapped to a direction of flow of power through the power line.

9. The assembly of claim 7, further comprising a table comprising a plurality of directions of flow of power through the power line, a plurality of protection coordination schemes mapped to the corresponding plurality of directions of flow, and a plurality of visual codes mapped to the corresponding protection coordination schemes.

10. The assembly of claim 1, wherein the plurality of fuses are coded to be visually distinct from each other.

* * * * *